Aug. 10, 1948.   G. B. ARNOLD ET AL   2,446,518
TRANSPORT AND SHIPPING DOLLY
Filed Nov. 8, 1944   3 Sheets-Sheet 1

INVENTORS
GEORGE B. ARNOLD
TRACY B. TYLER
BY
Swan, Frye + Hardesty
ATTORNEYS

Aug. 10, 1948.   G. B. ARNOLD ET AL   2,446,518
TRANSPORT AND SHIPPING DOLLY
Filed Nov. 8, 1944   3 Sheets-Sheet 2
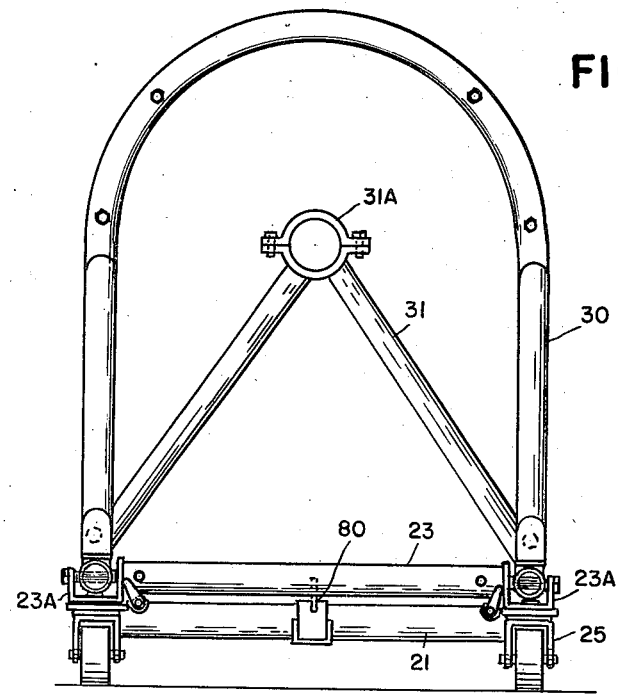
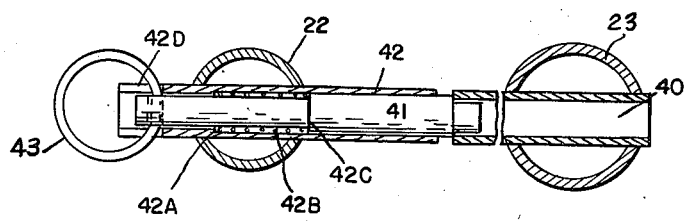
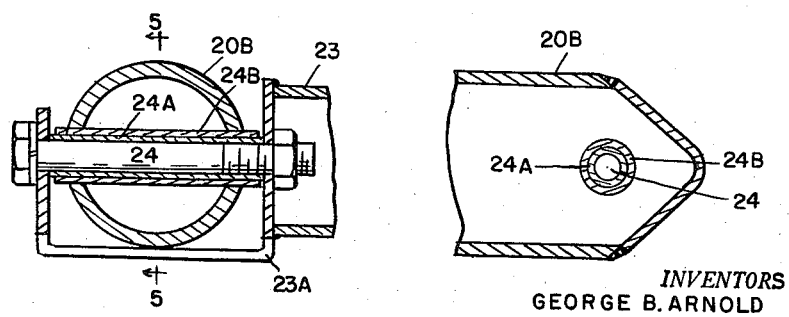
INVENTORS
GEORGE B. ARNOLD
TRACY B. TYLER
BY
ATTORNEYS Aug. 10, 1948.  G. B. ARNOLD ET AL  2,446,518
TRANSPORT AND SHIPPING DOLLY
Filed Nov. 8, 1944  3 Sheets-Sheet 3
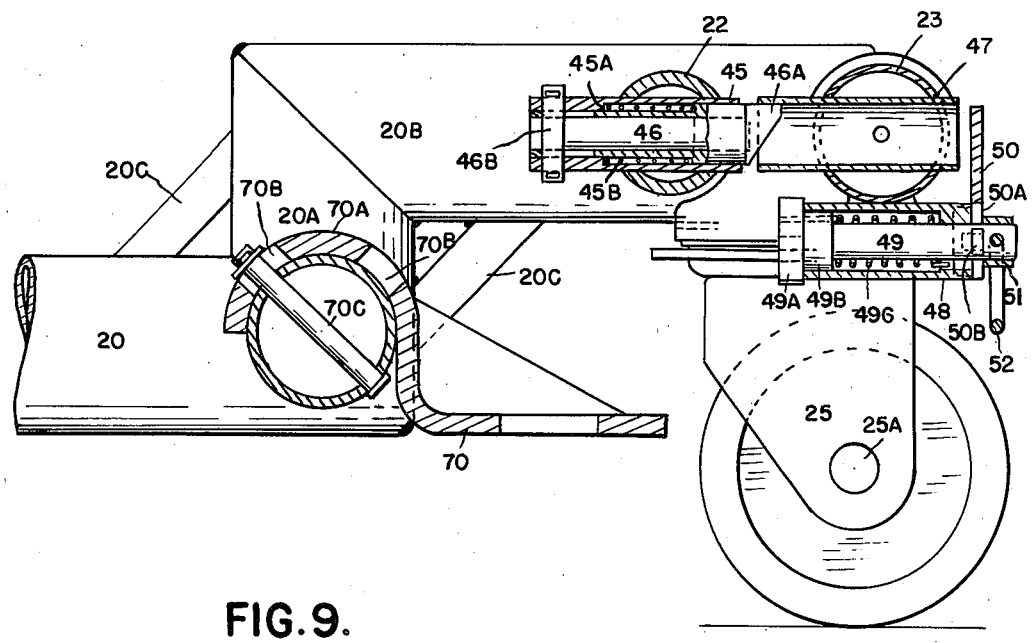
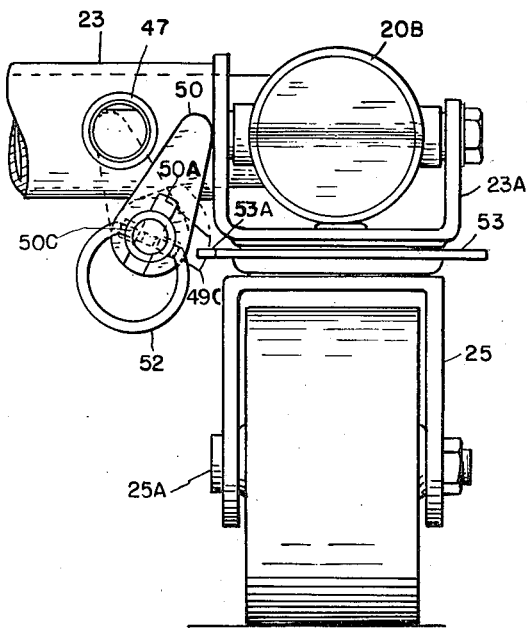
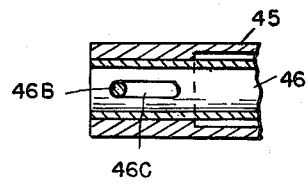
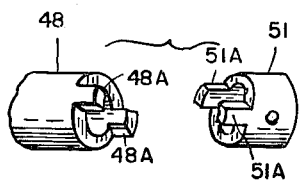
INVENTORS
GEORGE B. ARNOLD
TRACY B. TYLER
BY
ATTORNEYS Patented Aug. 10, 1948

2,446,518

UNITED STATES PATENT OFFICE 2,446,518

TRANSPORT AND SHIPPING DOLLY

George B. Arnold, Coral Gables, and Tracy B. Tyler, Miami Beach, Fla.

Application November 8, 1944, Serial No. 562,486

11 Claims. (Cl. 280—43)

This invention relates to cargo transporting devices, and particularly to such devices as adapted to transportation of cargo by airplanes, and more specifically to transportation of power plants or engines in airplanes though it is well suited to such transportation by ground vehicles as well as air vehicles.

A prime object of the invention is to provide a supporting device for an engine or other cargo so mounted on casters or rollers that it may easily and conveniently be rolled to the cargo space on any vehicle on which it is to be transported.

Another object is such a caster or roller mounted device provided with means for rapidly and easily retracting the casters or rollers so that the supporting device may be firmly and substantially battened down to the floor of the transporting vehicle.

A still further object of the invention is to provide relatively long rest footings or bearings so that the weight of the cargo and dolly may be distributed over as large an area as possible when battened to the floor of an airplane, which latter, as is known, is of comparatively light structure.

Other objects of the invention are: (1) to provide self-contained means for extending or retracting rollers or casters; means for locking the casters in operating position, and means for locking casters against swivel rotation; (2) to provide a relatively narrow and compact structure that will permit the device and its cargo to be moved and turned through narrow doorways and spaces; (3) to provide a structure of lightness so that air shipping weight will be reduced to a minimum; (4) to provide a structure that is adapted to be readily and easily picked up and lifted by a fork lift truck, or similar means; (5) to provide a structure wherein the center of gravity of an engine transported thereon is as low as floor clearance required by the engine itself will permit, and having rails or skids disposed slightly below the lowermost point of the engine for the protection thereof when being moved over rough surfaces.

Other objects and advantages will be apparent to those skilled in the art upon reference to the following description and the accompanying drawings in which Fig. 1 is a top plan view of the device embodying the present invention.

Fig. 3 is an end view as from the left of Fig. 2.

Fig. 4 is a sectional view of a detail of the construction at one of the corners.

Fig. 5 is a sectional view on line 5—5 of Figure 4.

Fig. 6 is a sectional view of an optional form of caster retraction locking device.

Fig. 7 is a sectional view of a part of the structure of Fig. 8 taken at right angles to the section of the latter.

Fig. 8 is a partly sectional view of a preferred form of caster retraction lock.

Fig. 9 is another view of the same as from the right of Fig. 8.

Fig. 10 is a perspective view showing a detail of construction of the lock of Figs. 8 and 9.

Figure 1:
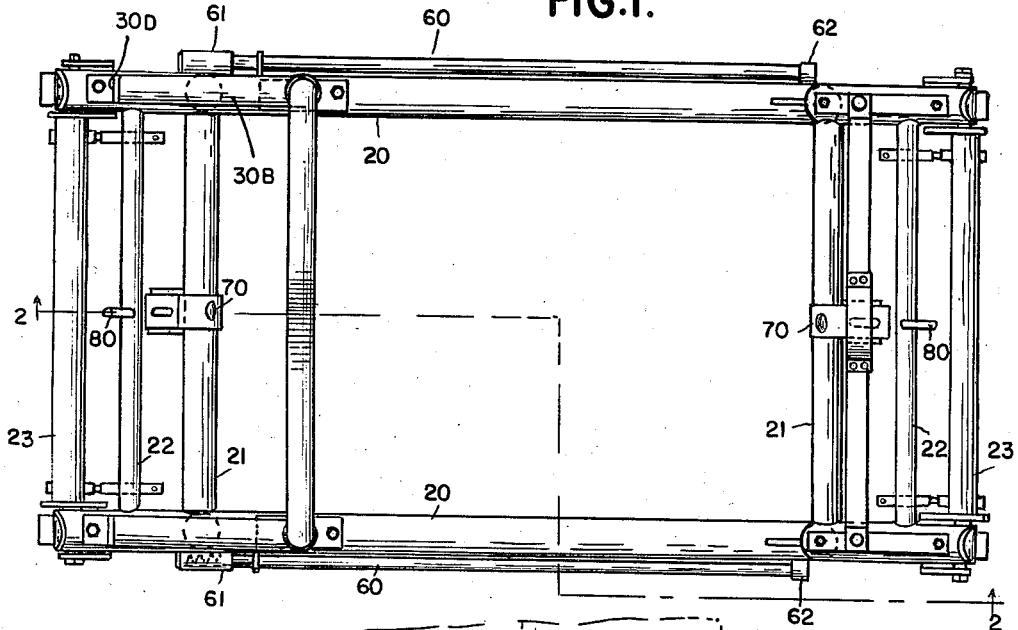

In the drawings there is shown a dolly embodying the present invention and designed for the handling and shipping by plane or other transport means of an airplane engine. Such an engine is indicated in dotted lines in Fig. 2.

The dolly is shown as consisting of a rectangular frame preferably constructed of tubing and constituting of side members 20 and cross members 21, the side members having welded at their ends short vertical pieces 20A to the tops of which are welded extensions 20B, suitable gussets or braces 20C, being used additionally to stiffen the side members. This formation of the side members 20 produces a drop frame construction which places the bottom plane of the frame only a short distance from the surface upon which the dolly may be standing—an advantage referred to hereinafter.

Extending across the frame between the extensions 20B are additional welded in cross members 22 serving further to strengthen the frame and for another later appearing purpose.

Between the extreme ends of the side members are mounted the cross members 23. These are tubular and have fixed to their ends stirrups 23A (see Figs. 4, 5, and 9) which embrace the ends of the extensions 20B and are provided with through bolts 24 and spacer sleeves 24A serving as spindles within suitable bushings or bearings 24B fixed in the extensions 20B. This arrangement permits the partial rotation of members 23 and stirrups 23A—the latter from below to above extension 20B or vice-versa.

As shown, there are mounted upon each of the stirrups 23A a suitable caster 25, preferably so located that the wheel spindle 25A, when in dolly supporting position, is always back of the axis of bearing 24B. With the casters 25 so mounted upon the rotatable member 23, they may be moved from their position under the frame to a position above the frame extensions 20B so as to lower the frame and allow it to rest upon the side members 20.

Mounted upon the side members 20 are suitable members forming a cradle or support for the machine or other article—in the present case an airplane engine—to be handled or shipped.

For the form of engine indicated these supports are shown to be two vertically arranged members 30 and 31, the former, member 30, consisting of a tube bent and mounted at 30A as an inverted U upon the drop portion of side members 20 near the vertical portion 20A and suitably braced by the diagonals 30B welded to tube 30 at 30C and bolted to side member extension 20B by means of a suitable racket 30D, this being welded to the brace 30B and bolted to member 20B. Suitable bolts 30E pass through the tube 30 and fix the engine thereto.

The member 31 is shown as consisting of an inverted V of tubing welded to the lower half of a split ring 31A adapted to embrace a suitable part of the engine. The two legs of the V extend to and may be secured to the extensions 20B at the other end of the side members 20 in similar fashion as braces 30B. It is of course obvious that the supporting members 30 and 31 may take such form as to be suitable to any engine or other device or cargo to be carried or shipped. It is also obvious that their longitudinal positions are determined by the character of the cargo, and that there may be a plurality of prepared positions to provide for different lengths of cargo.

Figure 2:
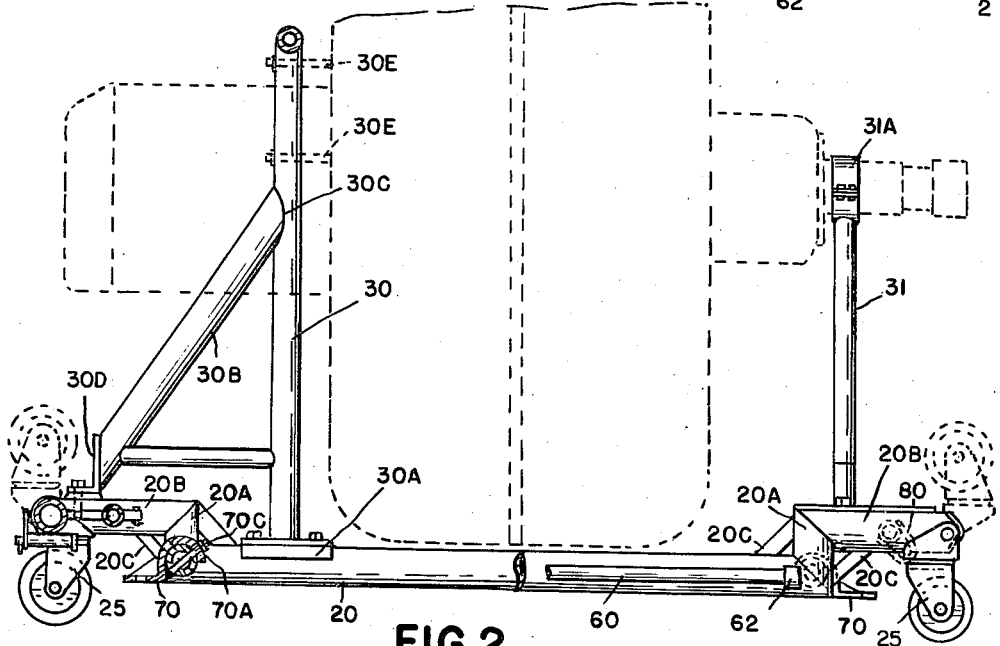
Fig. 2 is a side view of the same and indicating an engine mounted thereon.

In order to maintain the casters 25 in supporting position, particularly when moving the dolly, means must be provided for locking either the casters or the tubes 23 to which their upper stirrups are affixed. Two such locking devices are shown. One form is shown in Figs. 1, 2 and 6, and consists of short tube 40 passing diametrically through and welded to cross tube or member 22 acting as a socket or keeper for the end of a bolt 41, which latter is slidably carried in a tube 42 passing through and welded in tube 22. This tube 42 is counterbored to provide a shoulder 42A against which reacts a suitable spring 42B and, through a shoulder 42C on the bolt, tends to force the latter toward the keeper 40. The rear end of tube 42 is slotted as at 42D and a suitable ring 43 passed through a hole in the rear end of the bolt 41. This ring serves to maintain the parts in assembly and also will maintain the bolt 41 in retracted position when given a quarter turn.

As shown in Fig. 1, each of the tubes 23 will be provided with the lock.

The other and preferred form of lock is shown in Figs. 3 and 7 to 10, and four of these will be used, one for each caster. In this form, the tube 22 will also be provided with a tube passing diametrically therethrough. In this case, however, the through tube 45 is counterbored to provide a shoulder 45A as an abutment for a spring 45B acting against a shoulder on a bolt 46 slidably mounted in tube 45 and having a projecting portion 46A beveled on its lower side to form a latch. The bolt 46 is limited in its movement by means of a pin 46B fixed in the tube 45 and passing through a slot 46C in the rear end of the bolt. The latch 46A coacts with a short tube 47 passing diametrically through and welded in tube 23 adjacent a caster 25 (see Fig. 9).

Mounted below the tube 47 is another tube 48 counterbored as shown. In this tube 48 is a shaft 49 having at one end a head 49A larger than the tube but having a reduced portion 49B slidably and rotatably fitting in the tube end. At the other end, the shaft 49 passes out of the tube and carries a finger plate 50 which is slotted as at 50A so as to engage a pair of cooperating slots 50B, one disposed in either side of the shaft. Over the end of the shaft is placed a collar 51 having diametrical openings adapted to register with an opening in the shaft for the reception of a pull ring 52, serving to maintain the assembly.

Inside of tube 48 between the end of the counterbore and head portion 49B is a spring 49C fixed at one end to this head portion and at its other end to the tube 48 so as to enable it to be used both as a torsion spring and as a compression spring.

At the end next collar 51, the tube 48 is provided with two fingers 48A (see Fig. 10) of such width as to fit easily into finger slot 50A, while the collars 51 is also provided with fingers 51A adapted to extend through the finger plate 50 opposite the slots 50B, suitable aperture 50C through the finger plate being provided for this purpose.

Further, the head 49A of shaft 49 is provided with a flat substantially radial extension 49C as shown in Fig. 9. This extension 49C is adapted to cooperate with a suitable notch 53A in the plate 53 fixed to the roller stirrup or fork of the caster 25. One such notch 53A is provided in the plate 53 at such point that, when the extension 49C is engaged therein, the roller will be parallel with the longitudinal centerline of the dolly and in its outward swivel position to present least bias to retraction rotation about spindles 24.

In the operation of this lock, when the parts are in unlocked position, the shaft 49 and parts carried thereby, are in such radial position that the finger 50 lies over the end of tube 47 and the head extension 49C held above and out of contact with plate 53 by engagement of fingers 48A in finger plate aperture 50A. At the same time, the latch 46A is in the end of tube 47, thereby locking tube 23 against turning.

In order to rotate tube 23 and thereby the casters from operative position to their upper and inoperative position, a suitable rod or hand lever is inserted into tube 47 as a socket. But such a rod is prevented from entering the tube 47 by the finger 50.

To move the casters, it is therefore necessary to move finger 50 to one side. This may be done by pulling ring 52 so as to slide the fingers 48A out of the slot 50A to permit shaft 49 to turn. In Fig. 8, these parts are shown in the position assumed when the finger 50 is ready to be moved. The shaft 49, however, cannot rotate far enough to move finger 50 away from tube 47 until the caster is so aligned that the notch 53A is in position to receive the extension 49C on the head 49A of shaft 49. When the extension 49C drops into the notch 53A, the rod or hand lever may be inserted in tube 47 and the latch 46A thereby pushed out of engagement, thus permitting the tube 23 to turn.

In Figs. 8 and 9, the shaft 49 has been moved to its caster swivel locking position.

In either form of retraction lock, the locking tubes 40 or 47 are designed to be used as sockets for suitable rods, or hand levers for rotating the caster carrying cross tubes 23 and as a matter of convenience, it is proposed to mount such rods on the dolly in such fashion that they may be easily removed for use and restored.

In Figures 1 and 2 are shown such rods at 60 as carried by side members 20 in end sockets 61 and 62, the sockets 61 being deep, with a spring disposed therein, while the sockets 62 are merely shallow cups.

Since the dolly is designed for shipping by transport plane or other vehicle, means must be provided for anchoring the loaded dolly to the floor of the shipping compartment. Such anchoring means is shown in Figs. 1, 2 and 8, and consists of a strap member batten 70 having a horizontal portion whose bottom surface is substantially in the plane of the lower surfaces of side members 20 and which has a hooked end 70A extending up over a frame cross member 21. The horizontal portion will be provided with a suitable screw or bolt slot while the hook portion will be provided with two openings 70B so that a suitable pin 70C may be used to attach the strap to the member 21. The two openings 70B are preferably slotted or sufficiently large to permit some movement and free float or universal movement of the strap on the member 21 to assist in aligning the bolt holes without exact shifting and placing of the whole assembly.

Suitable tow rings may be provided as shown at 80, these being shown as carried by the frame cross-members 22.

In planes utilized for transport of engines or other freight, it is common to provide the floor or deck receiving the load with cargo rails or grooves to assist in properly placing such cargo load on the floor beams or fuselage longérons, and in the present device, the width of the dolly platform or frame is made to accord with the spacing of these cargo rails or grooves.

Further, it should be noted that the bottom surface of the side members is well below the vertical apex of the roller diameter. This reduces the distance of the side members from the supporting surface and lowers the center of mass of the loaded dolly to the lowest position possible without danger to the under parts of the engine. The engine or other load should, however, be so located that the members 20 are somewhat below the lowest parts of the engine in order to prevent striking the latter upon ridges or other high spots during transport, whether this be on the rollers or upon the frame members acting as skids or runners.

It should also be noted that the unitary construction of the dolly permits handling or lifting of the dolly and load by suitable lift devices such as cranes or the like.

Now having described the invention and the preferred embodiments thereof, it is to be understood said invention is to be limited, not to the specific details herein set forth, but only by the scope of the claims which follow.

What we claim is:

1. A device for supporting cargo in transit comprising in combination a frame of substantially rectangular form, having side members and cross members, said side members adapted to function as skids; a swivel mounted wheel at each corner of said frame, the transverse center line of said wheels being substantially in line with said side members, means whereby said wheels may be extended or retracted to cause said frame to assume a rolling condition or to rest in non-rolling condition on any general supporting surface, said wheels being larger in diameter than the distance from the bottom of the frame side members to the general supporting surface when the device is in rolling condition, means for fastening said frame to the general supporting surface when it is resting thereupon in non-rolling condition, automatic means for locking said wheels against non-intended retraction when in rolling position, means for locking said wheels against swivel rotation in a predetermined swivel position, means to prevent release of said wheel retraction locks until swivel locks are engaged, detachable cargo supports being provided on said frame and means whereby said cargo supports may be adjusted to accommodate cargo of various sizes.

2. A device for supporting cargo in transit comprising in combination a frame of substantially rectangular form, having side members and cross members, said side members having intermediate portions at a lower level than the rest of the frame and adapted to function as skids, a swivel mounted wheel at each corner of said frame, the transverse center line of said wheels being substantially in line with said side members, means extending transversely of said frame and connecting said wheel mountings in pairs, means whereby said pairs of wheels may be extended and thereby lift said frame to assume a rolling condition or retracted to cause said frame to rest in non-rolling condition on any general supporting surface, wheels larger in diameter than the distance from the bottom of the frame side members to the general supporting surface when the device is in rolling condition, means for fastening said frame to the general supporting surface when it is resting thereupon in non-rolling condition, automatic means for locking said wheels against non-intended retraction when in rolling position, detachable cargo supports provided on said frame and means whereby said cargo supports may be adjusted to accommodate cargo of various sizes.

3. A device for supporting cargo in transit comprising in combination a frame of substantially rectangular form, having side members and cross members, said side members having intermediate portions at a lower level than the rest of the frame and adapted to function as skids, a swivel mounted wheel at each corner of said frame, the transverse center line of said wheels being substantially in line with said side members, means whereby said wheels may be extended and thereby lift said frame to assume a rolling condition or retracted to cause said frame to rest in non-rolling condition on any general supporting surface, and means for fastening said frame to the general supporting surface when it is resting thereupon in non-rolling condition, said means including batten members floatingly carried by said frame.

4. A device for supporting cargo in transit comprising in combination a frame of substantially rectangular form, having side members and cross members, said side members having intermediate portions at a lower level than the rest of the frame and adapted to function as skids, a swivel mounted wheel at each corner of said frame, the transverse center line of said wheels being substantially in line with said side members, means whereby said wheels may be extended and thereby lift said frame to assume a rolling condition or retracted to cause said frame to rest in non-rolling condition on any general supporting surface, and means for fastening said frame to the generally supporting surface when it is resting thereupon in non-rolling condition, said means including batten members floatingly carried by said frame and reversible whereby to provide for longer or shorter prepared attaching positions on said surface.

5. A device for supporting cargo in transit comprising in combination a frame of substantially rectangular form, having side members and cross members, said side members having intermediate portions at a lower level than the rest of the frame and adapted to function as skids, a wheel at each corner of said frame, the transverse center line of the wheels being substantially in line with said side members, means whereby wheels may be extended or retracted to cause said frame to assume a rolling condition or to rest in non-rolling condition on any general supporting surface, said wheels being larger in diameter than the distance from the bottom of the frame side members to the general supporting surface when the device is in rolling condition, means for fastening said frame to the general supporting surface when it is resting thereupon in non-rolling condition, means for locking said wheels against non-intended retraction when in rolling position, detachable cargo supports being provided on said frame and means whereby said cargo supports may be adjusted to accommodate cargo of various sizes.

6. A device for supporting cargo in transit comprising in combination a frame of substantially rectangular form, having side members and cross members, said frame being of welded tube construction, said side members adapted to function as skids, a swivel mounted wheel at each corner of said frame, the transverse center line of said wheels being substantially in line with said side members, means whereby said wheels may be extended or retracted to cause said frame to assume a rolling condition or to rest in non-rolling condition on any general supporting surface, asid wheels being larger in diameter than the distance from the bottom of the frame side members to the general supporting surface when the device is in rolling condition, means for fastening said frame to the general supporting surface when it is resting thereupon in non-rolling condition, automatic means for locking said wheels against non-intended retraction when in rolling position, means for locking said wheels against swivel rotation in a predetermined swivel position, means to prevent release of said wheel retraction locks until swivel locks are engaged, detachable cargo supports of tubular material being provided on said frame and means whereby said cargo supports may be adjusted to accommodate cargo of various sizes.

7. A device for supporting cargo in transit comprising, in combination, a frame of substantially rectangular form, having side members and cross members, said side members having intermediate portions at a lower level than the rest of the frame and adapted to function as skids, a wheel at each corner of said frame, the transverse center line of the wheels being substantially in line with said side members, rotatable shafts supporting said wheels whereby said wheels may be extended or retracted to cause said frame to assume a rolling condition or to rest in non-rolling condition on any general supporting surface, said wheels being larger in diameter than the distance from the bottom of the frame side members to the general supporting surface when the device is in rolling condition, locking elements for holding said wheels against non-intended retraction when in rolling position, and cargo supports adjustable to accommodate cargo of various sizes detachably secured to said frame.

8. A device for supporting cargo in transit comprising, in combination, a frame having a pair of side members and cross members extending between and fixed to said side members, said side members having dropped intermediate portions offset from the extremeties of said side members to form a pair of substantially parallel skids, cargo engaging members for supporting cargo on said frame, wheels for said frame, shafts rotatably mounted upon said side member extremities, and supporting said wheels on axes offset from the axes of said shafts, the said wheels being movable with said shafts so that when said shafts are rotatably turned in one direction said wheels will be forced upwardly in an arcuate path to permit said skids to rest upon a general supporting surface for supporting said frame in non-rolling condition and when said shafts are rotatably turned in the opposite direction said wheels will be forced downwardly in an arcuate path into engagement with the general supporting surface beneath said side member extremities to jack said skids into elevated position thereby rollably to support said frame and devices carried by said shafts and adapted to be engaged by lever means for rotatably turning said shafts.

9. The device of claim 8 wherein the devices whereby the shafts may be rotatably turned comprise hollow tubular members carried transversely of the shafts.

10. A device for supporting cargo in transit comprising, in combination, a frame having a pair of side members and cross members extending between and fixed to said side members, said side members having dropped intermediate portions offset from the extremities of said side members to form a pair of substantially parallel skids, cargo engaging members for supporting cargo on said frame, wheels for said frame, shafts rotatably mounted upon said side member extremities, and supporting said wheels on axes offset from the axes of said shafts, the said wheels being movable with said shafts so that when said shafts are rotatably turned in one direction said wheels will be forced upwardly in an arcuate path to permit said skids to rest upon a general supporting surface for supporting said frame in non-rolling condition and when said shafts are rotatably turned in the opposite direction said wheels will be forced downwardly in an arcuate path into engagement with the general supporting surface beneath said side member extremities to jack said skids into elevated position thereby rollably to support said frame, devices carried by said shafts and adapted to be engaged by lever means for rotatably turning said shafts, and retractable members carried by said frame and engagable with said shafts to lock said wheels in their lowermost position rollably supporting said frame.

11. The device of claim 10 wherein the devices whereby the shafts may be rotatably turned comprise tubular sockets carried transversely of the shafts and wherein the retractable members for locking said wheels are engagable with said sockets when said members are in extended locking position.

GEORGE B. ARNOLD.
TRACY B. TYLER.

REFERENCES CITED

The following references are of record in the file of this patent:

UNITED STATES PATENTS

| Number | Name | Date |
|---|---|---|
| 431,953 | Pinckney | July 8, 1890 |
| 459,365 | Linden | Sept. 8, 1891 |
| 554,359 | Breed | Feb. 11, 1896 |
| 827,966 | Flake | Aug. 7, 1906 |
| 1,003,173 | McCloy | Nov. 7, 1911 |
| 1,027,686 | Bollinger | May 28, 1912 |
| 1,154,370 | Burke | Sept. 21, 1915 |
| 1,355,173 | Shadel et al. | Oct. 12, 1920 |
| 1,374,986 | Carter | Apr. 19, 1921 |
| 1,560,164 | Jarnagin | Nov. 3, 1925 |
| 1,847,157 | Wilhelm, Sr. | Mar. 1, 1932 |
| 1,857,468 | McGinness | May 10, 1932 |
| 2,003,162 | Ulmer | May 28, 1935 |
| 2,279,866 | Ellinwood | Apr. 14, 1942 |
| 2,319,581 | Brownlee et al. | May 18, 1943 |

FOREIGN PATENTS

| Number | Country | Date |
|---|---|---|
| 33,978 | France | Oct. 23, 1928 |